United States Patent Office 3,284,539
Patented Nov. 8, 1966

3,284,539
POLYURETHANES FROM TWO DISTINCT POLYURETHANE POLYMERS
Wilbur R. McElroy, New Martinsville, W. Va., assignor to Mobay Chemical Company, Pittsburgh, Pa., a corporation of Delaware
No Drawing. Filed Dec. 26, 1963, Ser. No. 333,707
9 Claims. (Cl. 260—858)

This invention relates to polyurethane plastics and a method of preparing same. More particularly, it relates to stable thermoplastic polyurethane polymers.

It has been heretofore known to prepare thermoplastic polyurethane polymers by reacting an organic compound containing active hydrogen atoms such as, for example, a polyalkylene ether glycol or a difunctional polyester containing hydroxyl groups with a chain-extending agent such as a low molecular weight diol, diamine or amino alcohol and an organic diisocyanate in an NCO to OH ratio close to unity to prepare a thermoplastic product which can be processed on equipment such as calenders, extruders, injection molding devices and the like. Such processes are disclosed in U.S. Patents 2,871,218 and 2,899,411.

Such processes produce excellent results when the actual NCO to OH ratio is achieved, however, in many instances, the actual NCO to OH ratio does not exactly agree with the calculated NCO to OH ratio which results by matching the equivalents of the NCO with the equivalents of active hydrogen atoms. This discrepancy results because of inconsistencies introduced into analysis of the hydroxyl containing polymer, the chain-extending agent and the diisocyanate in addition to the errors resulting in weighing or metering the components into the device in which the reactants are combined. Thus, the reproducibility in the manufacture of such thermoplastic polymers is not always satisfactory because the tolerances necessary to control the NCO to OH ratio cannot be satisfactorily achieved.

It is therefore an object of this invention to provide improved thermoplastic polyurethane polymers. It is still another object of this invention to provide an improved method of preparing stable thermoplastic polyurethane polymers. It is still another object of this invention to provide polyurethane polymers particularly suitable for calendering films. It is a further object of this invention to provide an improved method of controlling the actual NCO to OH ratio of a thermoplastic polyurethane polymer.

The foregoing objects and others which will become apparent from the following description are accomplished in accordance with the invention, generally speaking, by providing thermoplastic polyurethane polymers by preparing two distinct solid polymers by reacting a substantially linear difunctional hydroxyl terminated polymer having a molecular weight of at least about 600 and a difunctional chain-extender containing active hydrogen atoms which are reactive with NCO groups and having a molecular weight less than 300 with an organic diisocyanate wherein an OH terminated polymer is prepared at a calculated NCO to OH ratio of from about 0.900 to about 0.995, an NCO terminated polymer is prepared at a calculated NCO to OH ratio of from about 1.005 to about 1.10 and the two solid polyurethane polymers are combined in such quantities to produce a polymer having a calculated combined NCO to OH ratio of from about 0.960 to about 1.010 which will not exhibit significantly increasing melt viscosity within 20 minutes at a temperature at which it forms a continuous extruded strand from a melt viscometer in the temperature range of about 230 to 400° F. The preferred combined NCO to OH ratio is 0.98 to 1.01 because the physical properties become poorer at lower ratios.

It is recognized that due to the errors introduced in the process described above, a polymer made directly in the NCO/OH range of about 0.98 to 1.02 may be either OH-terminated or NCO-terminated depending on circumstances and therefore, a practical preferred range of operation to assure making an OH-terminated polymer is about 0.900 to 0.97 and that to amine making an NCO terminated polymer is 1.02 to 1.10.

Thus, the invention contemplates a method of preparing stable thermoplastic polyurethane polymers by combining two solid polymers having terminal groups which are reactive with each other, that is, one having NCO groups and the other having hydroxyl groups in specific ratios to achieve a product having a specific calculated NCO to OH ratio, the melt viscosity of which does not increase even upon applying further energy to the polymer.

In order to determine whether or not the combined material is within the scope of the invention, it is necessary to determine whether or not the melt viscosity of the combined polymers will exhibit increasing values. The material is tested in a melt viscometer at 360° F. using a piston pressure of 100 p.s.i. and orifice with length to diameter ratio 3.9. This apparatus gives values which are a measure of the degree of polymerization of the sample as it remains in the apparatus at elevated temperatures. In order for the material to be in accordance with this invention, the calculated NCO to OH ratio of the combined polymer system must be within the value set forth above and the melt viscosity must not increase significantly within 20 minutes in the viscometer at a temperature at which the material forms a continuous extruded strand from the viscometer in the range of 230 to 400° F.

Any suitable substantially linear difunctional hydroxyl terminated polymer having a molecular weight of at least about 600 such as, for example, dihydric polyesters, polyalkylene ether glycols, polythioether glycols, dihydric polyacetals and the like may be used.

Any suitable dihydric polyester may be used such as, for example, the reaction product of a dicarboxylic acid and a dihydric alcohol. Any suitable dicarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable dihydric alcohol may be used in the reaction with the dicarboxylic acid to form a polyester such as, for example, ethylene glycol, propylene glycol, butylene glycol, neopentyl glycol, amylene glycol, hexanediol, bis-(hydroxy-methyl-cyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethyl-amine and the like may be used. Any suitable polyester urethane may be used such as, for example, the reaction of any of the above-mentioned polyesters or polyester amides with a deficiency of an organic diisocyanate to produce a compound having terminal hydroxyl groups. Any of the diisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above with relation to the preparation of polyesters. Any suitable ether glycol may be used such as, for example, diethylene glycol, triethylene glycol, 1,4-phenylene-bis-hydroxy ethyl ether, 2,2'-diphenyl propane 4,4'-bis-hydroxy ethyl ether and the like.

Any suitable polyalkylene ether glycol may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the Encyclopedia of Chemical Technology, volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(β-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

It is preferred, in practising the process of this invention, that the hydroxyl terminated polymer have a molecular weight of from about 1500 to about 2500, an hydroxyl number of about 74 to 47 and an acid number less than 2.5

Any suitable organic diisocyanate may be used in reaction with the organic compound containing active hydrogen atoms to produce thermoplastically processable polyurethane polymers such as, for example, ethylene diisocyanate, ethylidene diisocyanate, propylene diisocyanate, butylene diisocyanate, hexamethylene diisocynate, cyclopentylene-1,3-diisocyanate, cyclohexylene-1,4-diisocyanate, cyclohexylene-1,2-diisocyanate, 2,4-tolylene diisocyanate, 2,6-toluylene diisocyanate, dimeric toluylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate and the like. It is preferred that aromatic diisocyanates be used and for best results, 4,4'-diphenylmethane diisocyanate or toluylene diisocyanate have proven to be especially suitable.

Any suitable chain extending agent containing active hydrogen atoms which are reactive with NCO groups and having a molecular weight less than about 300 may be used such as, for example, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(β-hydroxy ethyl ether), 1,3-phenylene-bis-(β-hydroxy ethyl ether) bis- (hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloroaniline), 3,3-dichloro-4,4'-biphenyl diamine, 2,6-diamino pyridine, 4,4'-diamino diphenylmethane and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene-disulfonic acid dihydrazide, omega-aminocapronic acid dihydrazide, gamma-hydroxy butyric hydrazide, bis-semicarbazide, bis-hydrazine carbonic esters of glycols such as many of the glycols heretofore mentioned and the like.

In the preparation of the two distinct polymers, the linear difunctional hydroxyl terminated polymer, the chain-extending agent and the isocyanate may be mixed simultaneously with each other or either the polymer or the extender can be first reacted with the isocyanate and then this polymer reacted with the third ingredient. Of course, it is essential that one of the polymers is prepared in the calculated NCO to OH ratio from the range about 0.900 to 0.995 while the other is prepared in the range of about 1.005 to 1.10. To prepare the two polymers, that is, the hydroxyl terminated polymer and the isocyanate terminated polymer, the reaction is at least continued until a solid which can be readily handled can be obtained. These polymers are then ground separately and can either be combined together on a suitable heated mill such as that used in the rubber industry or the powders may be dry blended together and then converted into one unitary mass utilizing a mill, extruder or the like. It is desirable as a subsequent step to extrude the material into a continuous strand which can then be pelletized. This facilitates both packing and storing of the polymers. Blends prepared in accordance with the above, whether they be melted or dry blended and extruded, produce excellent calendered films. The material of the prior art which exhibits thermoplastic properties will exhibit excellent calendered products, however, they are not reproducible and are frequently unstable because the actual NCO to OH ratio is difficult to control in preparing a given polymer resulting frequently in polymerization during the calendering operation which makes processing impossible. However, a very close control over the stability and calendering temperature by adjustment of NCO to OH ratio can be achieved in accordance with this invention because it directly relates to the quantity of each of the two types of polymers blended together. For example, in the process of the prior art a change of 0.02 in the NCO to OH ratio of a given polymer may change the temperature at which the material can be melted by 50° F. This NCO to OH ratio cannot be altered once the material is prepared and the softening temperature cannot be changed. By the process of this invention, the NCO to OH ratio can be varied depending upon the result desired after the two types of polymers are made. Very minor changes can be made in the overall NCO to OH ratio of the blend by making relatively large changes in the ratio of the polymers which are combined. This fine adjustment permits a stable product to be made reproducibly in a controlled way and permits the softening or milling temperature to be varied over a wide range.

The polymers prepared in accordance with this invention are suitable in the preparation of many varied types of non-porous polyurethane articles such as, for example, compression molding, injection molding, extrusions, calendered films and sheets and the like, such as, for example, shoe heels and soles, threads, shock absorbers, ball joints and the like.

The invention is further illustrated but not limited by the following examples in which parts are by weight unless otherwise specified.

*Example 1*

A series of elastomers are prepared by mixing about 100 parts of a dihydroxy polyester having a molecular weight of about 2000, an hydroxyl number of 58 and an acid number of 1.39 which is prepared from 11 mols of 1,4-butanediol and 10 mols of adipic acid, about 9.6 parts of 1,4-butanediol and sufficient 4,4'-diphenylmethane diisocyanate to produce solid polymers having an NCO to OH ratio of 0.900, 0.920, 0.940, 0.960, 0.980, 1.005 and 1.020, 1.080, 1.100. The elastomers are made by mixing the reactants at temperatures of from about 80 to 100° C. in a mixing device and casting into a sheet about ½ inch thick on a hot steam table heated to about 110° C. The sheet is allowed to remain on a steam table for about 12 minues and then ground to −4 mesh.

Different amounts of the hydroxyl and NCO terminated elastomers are blended together to give overall calculated NCO to OH ratios set forth in the following table. This table also indicates the milling temperature of the blend in ° F.

MILLING TEMPERATURE OF BLENDS MADE AT DIFFERENT OVER-ALL NCO/OH RATIOS

| Nominal NCO/OH of Individual Polymers | | Calc. Over-all NCO/OH of Blend | Milling Temp. of Blend, ° F. |
|---|---|---|---|
| OH Terminated | NCO Terminated | | |
| .900 | 1.100 | .960 | 250 |
| .920 | 1.005 | .960 | 250 |
| .920 | 1.005 | .968 | 265 |
| .920 | 1.020 | .970 | 270 |
| .920 | 1.005 | .976 | 285 |
| .940 | 1.020 | .980 | 300 |
| .960 | 1.005 | .980 | 300 |
| .920 | 1.005 | .985 | 305 |
| .980 | 1.020 | .985 | 305 |
| .960 | 1.020 | .991 | 320 |
| .940 | 1.080 | .991 | 320 |

The same results are achieved whether the mixed blend is extruded and pelletized or whether the compounds are mixed directly on the mill. Milled, extruded and pelletized sheets are stable under ambient storage conditions for indefinite periods of time even in the presence of atmospheric moisture. All of the blends set forth in the table do not exhibit increasing consistency values when maintained in a Brabender Plastograph with a Banbury attachment for 30 minutes at a temperature of 130° C. nor increasing melt index values at 360° F. when held in the apparatus up to 20 minutes.

*Example 2*

Polymers prepared using the same reactants as set forth in Example 1 are made. However, the two polymers have a calculated NCO to OH ratio of 1.04 and 0.96 respectively. Each of the two polymers are ground to −4 mesh and melted together on a rubber mill in a ratio of 70 parts of the hydroxyl terminated polymer to 30 parts of the NCO terminated polymer. This material melts well at a temperature of 295° F. and does not exhibit an increasing consistency value in a Brabender Plastograph even after 1 hour at 120° C. nor an increasing melt index value when held in the instrument for 20 minutes at 360° F.

*Example 3*

Two elastomers are prepared by mixing about 100 parts of a dihydroxy polyester having a molecular weight of about 2000, an OH number of about 56 and an acid number of about 1.05 which is prepared from 11 mols of ethylene glycol and 10 mols of adipic acid, about 51.7 parts of 1,4-butylene glycol and sufficient toluylene diisocyanate containing 80% 2,4-isomer and 20% 2,6-isomer to produce solid polymers having NCO to OH ratios of .98 to 1.05 and curing on a steam table at 110° C. The ground materials are mixed in the ratio of 42 parts of NCO-terminated polymer and 58 parts of OH-terminated polymer and blended on a rubber mill. The blend shows no increase in melt index when held in the instrument at 315° F. for 20 minutes and does not cure on the mill when milled at 320° F. for 60 minutes. The combined NCO to OH ratio of this polymer blend is 1.01.

It is, of course, to be understood that any of the reactants set forth above may be used in place of those specifically used throughout the working examples and that any suitable hydroxyl terminated and NCO terminated polymer prepared within the calculated NCO to OH ratio may be used in place of those specifically used.

Although the invention has been described in considerable detail for the purpose of illustration, it is to be understood that variations can be made by those skilled in the art without departing from the spirit of the invention and scope of the claims.

What is claimed is:

1. A method for producing stable thermoplastic polyurethane polymers which comprises combining and melting a first solid polymer and a second solid polymer together in a ratio such that the calculated NCO/OH is from about 0.960 to about 1.010 and such that the melt viscosity does not increase substantially within 20 minutes at a temperature at which the combined polymers form a continuous extruded strand at a temperature of from about 230 to about 400° F., said first polymer having been prepared by reacting a substantially linear difunctional hydroxyl terminated polymer having a molecular weight of at least about 600 and a difunctional chain-extending agent containing active hydrogen atoms which are reactive with NCO groups and having a molecular weight less than about 300 with an organic diisocyanate, said first polymer having been prepared at a calculated NCO/OH of from about 0.900 to about 0.995, said second solid polymer having been prepared by reacting a substantially linear difunctional hydroxyl terminated polymer having a molecular weight of at least about 600 and a difunctional chain-extending agent containing active hydrogen atoms which are reactive with NCO groups and having a molecular weight less than about 300 with an organic diisocyanate, said second polymer having been prepared at a calculated NCO/OH of from about 1.005 to about 1.100.

2. A method for producing stable thermoplastic polyurethane polymers which comprises combining and melting a first solid polymer and a second solid polymer together in a ratio such that the calculated NCO/OH is from about 0.960 to about 1.010 and such that the melt viscosity does not increase substantially within 20 minutes at a temperature at which the combined polymers form a continuous extruded strand at a temperature of from about 230 to about 400° F., said first polymer having been prepared by reacting a substantially linear difunctional hydroxyl terminated polymer having a molecular weight of at least about 600 and selected from the group consisting of polyesters prepared by reacting dihydric alcohols with dicarboxylic acids, polyalkylene ether glycols, polythioether glycols and polyacetals; and a difunctional chain-extending agent containing active hydrogen atoms which are reactive with NCO groups and having a molecular weight less than about 300 with an organic diisocyanate, said first polymer having been prepared at a calculated NCO/OH of from about 0.900 to about 0.995, said second solid polymer having been prepared by reacting a substantially linear difunctional hydroxyl terminated polymer having a molecular weight of at least about 600 and selected from the group consisting of polyesters prepared by reacting dihydric alcohols with dicarboxylic acids, polyalkylene ether glycols, polythioether glycols and polyacetals; and a difunctional chain-extending agent containing active hydrogen atoms which are reactive with NCO groups and having a molecular weight less than about 300 with an organic diisocyanate, said second polymer having been prepared at a calculated NCO/OH of from about 1.005 to about 1.100.

3. The process of claim 1 wherein the organic diisocyanate is an aromatic diisocyanate.

4. The process of claim 1 wherein the organic diisocyanate is 4,4'-diphenylmethane diisocyanate.

5. The process of claim 1 wherein the organic diisocyanate is tolylene diisocyanate.

6. The process of claim 1 wherein the substantially linear difunctional hydroxyl terminated polymer is a polyester.

7. The process of claim 1 wherein the substantially linear difunctional hydroxyl terminated polymer is a polyalkylene ether glycol.

8. The process of claim 1 wherein the difunctional chain extending agent is 1,4-butanediol.

9. The process of claim 1 wherein the difunctional chain extending agent is 1,4-phenylene-bis-($\beta$-hydroxy ethyl ether).

References Cited by the Examiner

UNITED STATES PATENTS

| 2,888,432 | 5/1959 | Fauser | 260—858 |
| 2,894,919 | 7/1959 | Simon et al. | 260—2.5 |
| 3,094,495 | 6/1963 | Gemeinhardt | 260—858 |

FOREIGN PATENTS

| 635,894 | 2/1962 | Canada. |
| 665,361 | 6/1963 | Canada. |

LEON J. BERCOVITZ, *Primary Examiner.*

J. J. KLOCKO, *Assistant Examiner.*